United States Patent
Brakes

(10) Patent No.: US 10,870,480 B2
(45) Date of Patent: Dec. 22, 2020

(54) MAGNETIC SEALS

(71) Applicant: AIRBUS OPERATIONS LIMITED, Bristol (GB)

(72) Inventor: David Brakes, Bristol (GB)

(73) Assignee: Airbus Operations Limited, Bristol (GB)

( * ) Notice: Subject to any disclaimer, the term of this patent is extended or adjusted under 35 U.S.C. 154(b) by 237 days.

(21) Appl. No.: 15/957,100

(22) Filed: Apr. 19, 2018

(65) Prior Publication Data
US 2018/0312242 A1  Nov. 1, 2018

(30) Foreign Application Priority Data
Apr. 26, 2017 (GB) .................................. 1706640.8

(51) Int. Cl.
*B64C 7/00* (2006.01)
*B64C 3/56* (2006.01)
(Continued)

(52) U.S. Cl.
CPC .................. *B64C 7/00* (2013.01); *B64C 3/50* (2013.01); *B64C 3/546* (2013.01); *B64C 3/56* (2013.01);
(Continued)

(58) Field of Classification Search
CPC .. B64C 1/30; B64C 3/56; B64C 3/546; B64C 3/50; B64C 5/00; B64C 7/00; B64C 9/02; B64C 9/30
See application file for complete search history.

(56) References Cited

U.S. PATENT DOCUMENTS 5,570,859 A * 11/1996 Quandt .................... B64C 9/18
                                                  244/113
7,661,680 B2 * 2/2010 Langberg ............... F16J 15/061
                                                  277/629

(Continued)

FOREIGN PATENT DOCUMENTS

EP           3 255 320          12/2017

OTHER PUBLICATIONS

European Search Report cited in EP 18263340.5, dated Jun. 13, 2018, 10 pages.
Search Report for GB1706640.8 dated Oct. 24, 2017, 2 pages.

*Primary Examiner* — Christopher D Hutchens
(74) *Attorney, Agent, or Firm* — Nixon & Vanderhye P.C.

(57) ABSTRACT

An aerodynamic structure for an aircraft including a first region having a first magnetic sealing surface, movably connected to a second region having a second magnetic sealing surface. The structure is moveable between a first configuration in which the first sealing surface contacts the second sealing surface such that the first region and the second region form a continuous aerodynamic surface, and a second configuration in which a gap exists between the first and second magnetic sealing surfaces and. The magnetic sealing surfaces are configured such that an attractive magnetic force exists between the magnetic sealing surfaces in the first configuration. The aerodynamic structure is configured such that during movement between the first and second configurations, relative movement of the first and second regions occurs along a direction at an angle in the range 1-90° to the normal of the first sealing surface and/or the second sealing surface.

18 Claims, 7 Drawing Sheets

(51) Int. Cl.
*B64C 3/50* (2006.01)
*B64C 3/54* (2006.01)
*B64C 9/30* (2006.01)
B64C 9/16 (2006.01)
B64C 9/22 (2006.01)
B64C 9/00 (2006.01)

(52) U.S. Cl.
CPC ............... *B64C 9/30* (2013.01); *B64C 9/16* (2013.01); *B64C 9/22* (2013.01); *B64C 2009/005* (2013.01)

(56) References Cited

U.S. PATENT DOCUMENTS

| | | | |
|---|---|---|---|
| 9,010,693 B1* | 4/2015 | Barbieri | B64C 39/024 244/218 |
| 9,809,295 B1* | 11/2017 | Bauer | B64C 1/14 |
| 10,562,623 B1* | 2/2020 | Sloan | B64C 13/18 |
| 2010/0096504 A1* | 4/2010 | Candela | B64C 7/00 244/129.4 |
| 2015/0167777 A1 | 6/2015 | Hull et al. | |
| 2015/0266561 A1* | 9/2015 | Hariram | B60J 10/38 49/475.1 |
| 2016/0229526 A1* | 8/2016 | Hegenbart | B64C 13/16 |
| 2017/0174315 A1 | 6/2017 | Neal et al. | |
| 2019/0210712 A1* | 7/2019 | Schlipf | B64C 13/503 |

* cited by examiner

MAGNETIC SEALS

RELATED APPLICATION

This application claims priority to United Kingdom patent application GB 1706640.8, filed Apr. 26, 2017, the entirety of which is incorporated by reference.

TECHNICAL FIELD

The present invention relates to an aerodynamic structure for an aircraft. In particular, the present invention relates to an aerodynamic structure comprising a first region having a first magnetic sealing surface, which is movably connected to a second region having a second magnetic sealing surface.

BACKGROUND

Seals are required at various points in an aircraft. Some seals are used to form an aerodynamic seal—that is, they serve to seal gaps (discontinuities) in an aerodynamic surface of the aircraft, to reduce or prevent airflow through those gaps. Such gaps in an aerodynamic surface exist, for example, at the edges of flight control surfaces such as slats and spoilers.

In some known aircraft designs (typically military aircraft), each of the aircraft's wings comprises an outer region which may be folded about a generally chordwise hinge line, between a flight configuration and a ground configuration. Recently, folding wing-tip arrangements have been proposed for commercial airliners which comprise an outer (tip) region which folds by rotating about a substantially vertical (or slightly offset from vertical) axis (with reference to the operational orientation of the aircraft). Such arrangements may enable the aircraft to occupy a relatively small space when on the ground, but to still have a relatively large wing span for flight. The join between the inner and outer region creates a gap in the aerodynamic surface of the wing and it is desirable to seal this gap when the wing is in a flight configuration to minimize the impact of the gap on the aerodynamic performance of the wing.

SUMMARY

A first aspect of the present invention provides an aerodynamic structure for an aircraft. The aerodynamic structure comprises a first region having a first magnetic sealing surface. The first region is movably connected to a second region having a second magnetic sealing surface. The aerodynamic structure is moveable between a first configuration in which the first sealing surface contacts the second sealing surface such that the first region and the second region form a continuous aerodynamic surface and a second configuration in which a gap exists between the first sealing surface and the second sealing surface. The first and second magnetic sealing surfaces are configured such that an attractive magnetic force exists between the first and second magnetic sealing surfaces when the aerodynamic structure is in the first configuration. The aerodynamic structure is configured such that during movement between the first configuration and the second configuration, relative movement of the first and second regions occurs along a direction at an angle in the range 1-90° to the normal of the first sealing surface and/or the normal of the second sealing surface.

Optionally, at least one of the first and second magnetic sealing surfaces is formed by a magnetic seal element comprising a magnet and a flexible mounting connecting the magnet to a corresponding one of the first and second regions, such that the magnet is movable relative to the region in at least a direction normal to the magnetic sealing surface. Optionally, the magnetic seal element comprises at least one trap feature adjacent to the magnetic sealing surface, wherein a surface of the magnetic seal element comprised in the trap feature is closer to a magnetic pole of the magnet than any location on the magnetic sealing surface. The magnetic sealing surface formed by the magnetic sealing element may comprise opposing long sides, in which case optionally the magnetic sealing element comprises a trap feature adjacent each long side. Optionally, the corresponding one of the first and second regions comprises a support formation configured to constrain movement of the magnet parallel to the magnetic sealing surface. The support formation may comprise a channel, in which case optionally the magnetic seal element is at least partially received within the channel. Optionally, the magnet comprises a flexible strip magnet having a north pole at one long edge of the strip and a south pole at an opposing long edge of the strip.

Optionally, in the first configuration, the first and second magnetic sealing surfaces are substantially perpendicular to the continuous aerodynamic surface.

Optionally, at least one of the first and second magnetic sealing surfaces comprises an anti-friction material.

Optionally, the first and second magnetic sealing surfaces are configured such that a negligible magnetic force exists between the first and second magnetic sealing surfaces when a distance between the first and second magnetic sealing surfaces is greater than a preselected value. The preselected value may be in the range of 3-10 mm.

Optionally, the first region comprises a root section of an aircraft wing, and the second region comprises a tip section of an aircraft wing which is rotatable relative to the root section. In such cases, optionally during movement between the first configuration and the second configuration, relative movement of the first and second regions occurs along a direction which is at an angle in the range 1-60° to the normal of the first sealing surface and/or the normal of the second sealing surface.

Optionally, the first region comprises an aircraft wing and the second region comprises one of: a slat; an aileron; a spoiler; a flap. In such cases, optionally during movement between the first configuration and the second configuration, relative movement of the first and second sealing surfaces occurs along a direction which is substantially perpendicular to the normal of the first sealing surface and/or the normal of the second sealing surface.

There is also provided, according to a second aspect of the invention, an aircraft comprising an aerodynamic structure according to the first aspect.

BRIEF DESCRIPTION OF THE DRAWINGS

Embodiments of the invention will now be described, by way of example only, with reference to the accompanying drawings, in which:

FIG. 4b is a schematic view of a magnetic field generated by the example region of FIG. 4a;

DETAILED DESCRIPTION

Figure 1A:
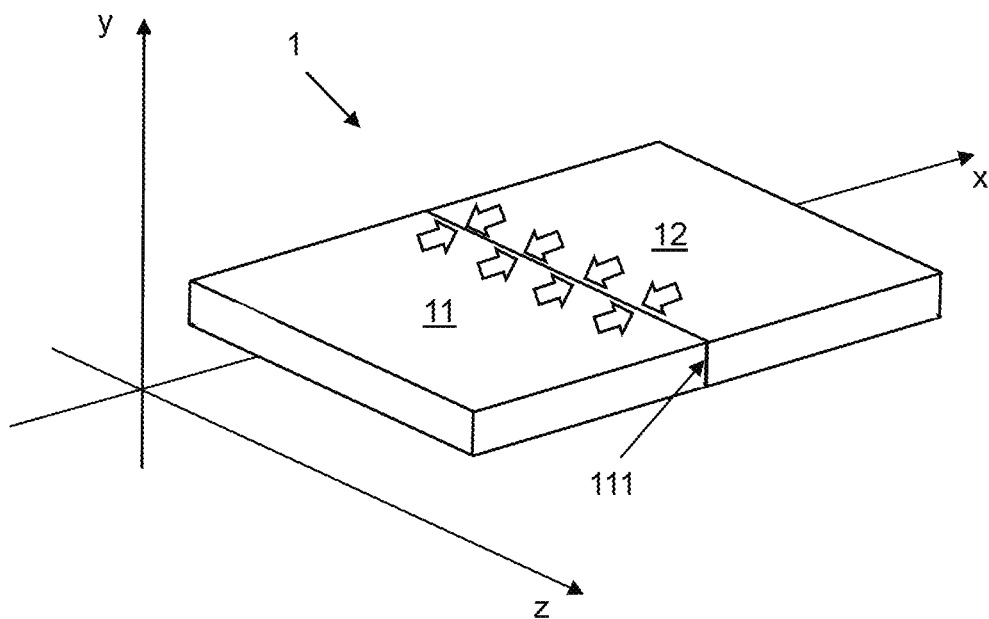
FIG. 1a is a schematic perspective view of an example aerodynamic structure according to the invention, in a first configuration.

The examples described below relate to aerodynamic structures for aircraft. As used herein, the term "aerodynamic structure" is intended to refer to any structure having a surface which is exposed to airflow during flight, such that the nature of the structure (and in particular the surface) will affect the aerodynamic performance of an aircraft in which the structure is comprised. An aerodynamic surface of an aerodynamic structure may typically be configured to create and/or maintain, as far as possible, desired airflow characteristics (e.g. laminar flow) during flight.

Each example aerodynamic structure described below comprises a first region having a first magnetic sealing surface, which is movably connected to a second region having a second magnetic sealing surface. In each example, the aerodynamic structure is moveable between a first configuration in which the first sealing surface contacts the second sealing surface such that the first region and the second region form a continuous aerodynamic surface, and a second configuration in which a gap exists between the first sealing surface and the second sealing surface. The first and second magnetic sealing surfaces are configured such that an attractive magnetic force exists between the first and second magnetic sealing surfaces when the aerodynamic structure is in a first configuration. Notably, in each example the aerodynamic structure is configured such that during movement between the first configuration and the second configuration, relative movement of the first and second regions occurs along a direction at an angle in the range 1-90° to the normal of the first sealing surface and/or the normal of the second sealing surface.

In some (but not necessarily all) examples, the relative movement of the first and second sealing regions may occur along a direction which is out of plane with at least part of the aerodynamic surface formed by the first and second regions. It will be appreciated that, when considered in their entirety, aircraft aerodynamic surfaces are often not planar. However; for any given point on the surface a tangential plane may be defined, which is perpendicular to the surface normal at that point. For the purposes of this specification, the plane of a part of a surface may be considered to be the tangential plane of any point comprised in that part.

As used herein, the term "sealing surface" is intended to refer to a surface on or associated with a first structure region, which contacts an opposing surface on or associated with a second structure region, to seal a gap between the first and second structure regions. It is expected that the first and second structure regions are arranged for significant relative movement during normal operation, such that the sealing surfaces are required to repeatedly separate and re-engage. A sealing surface may be substantially perpendicular to an aerodynamic surface formed by the first and second structure regions. To achieve a good contact between the sealing surfaces (and therefore a good seal), typically an opposing pair of sealing surfaces will be parallel to each other, at least in a sealed configuration of the aerodynamic structure.

For many applications, aerodynamic seals must accommodate some relative movement between the two structure regions on either side of the gap being sealed, and potentially also significant pressure loading, whilst maintaining the seal. Conventional seals address these requirements through seal deformation in a nominal sealed state (for example, seals which comprise one or more deformable seal elements that are compressed against an opposing seal element or structure in the nominal sealed state) and/or geometric interference (for example, seals which comprise a seal element that overlaps or otherwise interferes with an opposing seal element or structure in the nominal sealed state).

However; these conventional solutions can be problematic for sealing gaps between structure regions which are configured for relative movement along a direction which is out of plane with an aerodynamic surface formed by the structure regions (e.g. structure regions which are configured for relative movement such that relative movement of the sealing surfaces occurs along a direction which is at an angle in the range 1-90° to the normal of the first sealing surface and/or the normal of the second sealing surface). This is because the necessarily compressible/deformable nature of the seal elements results in expansion of the seal elements as the first and second structure regions move away from each other during a separation process. Conversely, when the first and second structure regions move back towards each other, the expanded seal elements will come into contact before the movement is complete. In situations where the sealing surfaces are not approaching each other along a common normal, it is likely that the seal elements will clash with each other and/or the structure regions, and thereby become deflected away from a correct sealing position. This can result in poor sealing efficacy and damage to the sealing elements and/or the structure regions.

The examples described herein advantageously provide a solution for creating an aerodynamic seal between two structure regions which are configured to move relative to each other along a direction which is angled to the surface normal of at least one sealing surface. This advantage is achieved by utilising magnetic force to maintain two opposed sealing surfaces in contact when the structure regions are in the sealed configuration, as will be explained in more detail below.

Figure 1B:
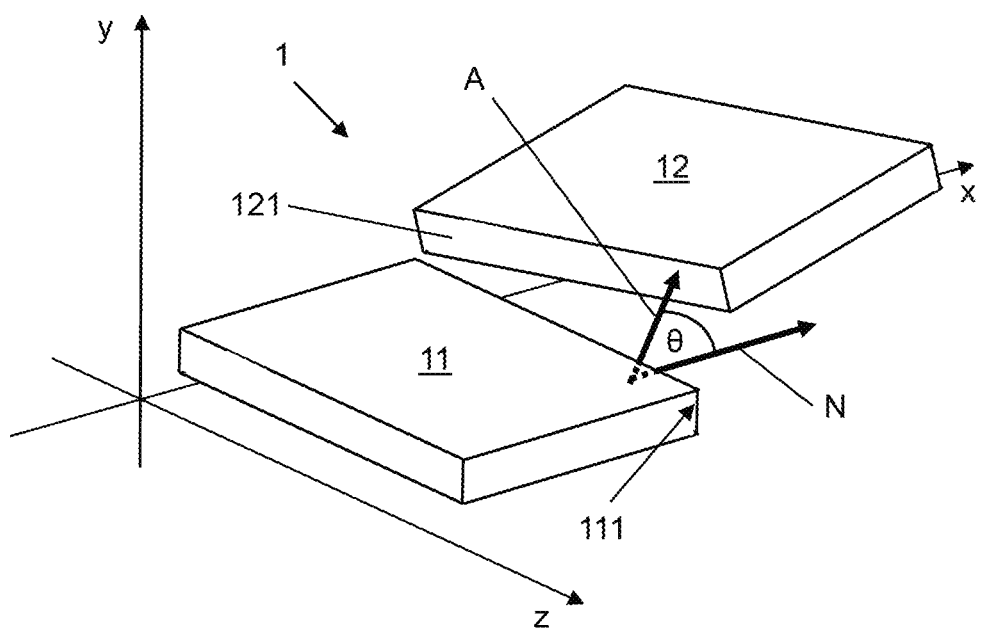
FIG. 1b is a schematic perspective view of the example aerodynamic structure of FIG. 1a, in a second configuration.

FIGS. 1a and 1b show an aerodynamic structure 1 for an aircraft. The aerodynamic structure 1 is shown in a first (sealed) configuration in FIG. 1a, and in a second (unsealed, or separated) configuration in FIG. 1b. The aerodynamic structure 1 comprises a first region 11 having a first magnetic sealing surface 111 and a second region 12 having a second magnetic sealing surface 121. The first region 11 is movably connected to the second region 12 by any suitable mechanism (not shown) such as a hinge, slew ring, bearing, actuator or the like. In the first configuration the first sealing surface 111 contacts the second sealing surface 121 such that the first region 11 and the second region 12 form a continuous aerodynamic surface (the top surface as shown in FIG.

1a). The aerodynamic structure 1 is movable between the first configuration and the second configuration, in which a gap exists between the first sealing surface 111 and the second sealing surface 121.

The aerodynamic structure 1 may be any structure comprised of relatively moveable regions that cooperate to form part of an aerodynamic surface of an aircraft. For example, the aerodynamic structure may be a wing, or a part of a wing. If the aerodynamic structure is a wing, the first region may comprise an outer (tip) part of the wing and the second region may comprise an inner (root) part of the wing. Alternatively, the first region may comprise a high-lift device such as a spoiler or a slat, and the second region may comprise a structural part of the wing (e.g. a wingbox, a fixed leading edge or a fixed trailing edge). In some examples the aerodynamic structure may be (at least part of) a vertical stabilizer, or (at least part of) a horizontal stabilizer (tailplane).

The aerodynamic structure 1 is configured such that during movement between the first configuration and the second configuration, relative movement of the first and second regions 11, 12 occurs along a direction A which is at an angle θ in the range 1-90° to the normal N of the first sealing surface 111. It will be appreciated that N is also the normal of the second sealing surface 121 when the aerodynamic structure 1 is in the first configuration, since the first and second sealing surfaces 111, 121 are parallel and adjacent in the first configuration. Relative movement of the first and second regions may be considered to be relative movement of a given location on the first region and a given location on the second region. In the illustrated example, the direction of relative movement A (between the locations connected by the head end and the tail end of the arrow, which are corresponding locations on the first and second sealing surfaces 111, 121) is constant for the whole duration of the movement between the first configuration and the second configuration, and θ is approximately 45°. However; other examples are possible in which the direction of relative movement (and therefore the value of θ) changes over the course of the movement between the first configuration and the second configuration. In such examples, θ is in the range 1-90° during at least part of the movement between the first configuration and the second configuration. In some examples, different pairs of locations (that is pairs comprising a location on the first region and a location on the second region) may be associated with different relative movement directions and/or distances. In such examples, at least one pair of locations will experience relative movement along a direction at the angle θ during at least part of the movement between the first configuration and the second configuration.

In the illustrated example, each of the first and the second magnetic sealing surfaces 111, 121 is substantially perpendicular to the aerodynamic surface. Other examples are possible in which the first magnetic sealing surface 111 is at an acute angle to the aerodynamic surface and the second magnetic sealing surface 121 is at an obtuse angle to the aerodynamic surface, or vice versa, in the manner of a scarf joint. In the illustrated example, each of the first and second magnetic sealing surfaces 111, 121 is substantially planar. Other examples are possible in which the first and second magnetic sealing surfaces are curved (for example the folding wing of FIGS. 5a and 5b, described below). If the first and second magnetic sealing surfaces are not planar, they should be correspondingly shaped such that contact between the two magnetic sealing surfaces is achieved over substantially the entire area of each magnetic sealing surface in the first configuration of the aerodynamic structure 1. In some examples one or both of the magnetic sealing surfaces 111, 121 comprises an anti-friction material. For example, one or both of the magnetic sealing surfaces 111, 121 may be formed from an anti-friction material, or may be coated with an anti-friction material. Any suitable anti-friction material can be used, such as PTFE. Reducing friction between the magnetic sealing surfaces 111, 121 facilitates relative sliding movement of the magnetic sealing surfaces 111, 121 when the aerodynamic structure 1 is in the first configuration. Permitting sliding of the magnetic sealing surfaces 111, 121 can advantageously improve the ability of the sealing surfaces to accommodate relative movement between the first and second regions 11, 12 during operation of the aerodynamic structure 1 in the first configuration.

The first and second magnetic sealing surfaces 111, 121 are configured such that an attractive magnetic force (represented by the block arrows in FIG. 1a) exists between the first and second magnetic sealing surfaces 111, 121 when the aerodynamic structure 1 is in the first configuration. In some examples the first and second magnetic sealing surfaces 111, 121 are configured such that a negligible magnetic force exists between the first and second magnetic sealing surfaces 111, 121 when a distance between the first and second magnetic sealing surfaces is greater than a preselected value. The preselected value may be at least 3 mm. The preselected value may be, for example, in the range 3-10 mm. Configuring the first and second magnetic sealing surfaces 111, 121 such that a negligible magnetic force exists between them when they are separated by more than a certain distance can advantageously ensure that, during a movement of the aerodynamic structure 1 from the second configuration to the first configuration, the first and second magnetic sealing surfaces 111, 121 remain separated until the aerodynamic structure 1 is in (or very nearly in) the first configuration. The risk of the sealing surfaces clashing is thereby reduced or avoided. The magnetic force may be created by any suitable mechanism, for example by magnets comprised in the first and/or second regions 11, 12.

Figure 2:
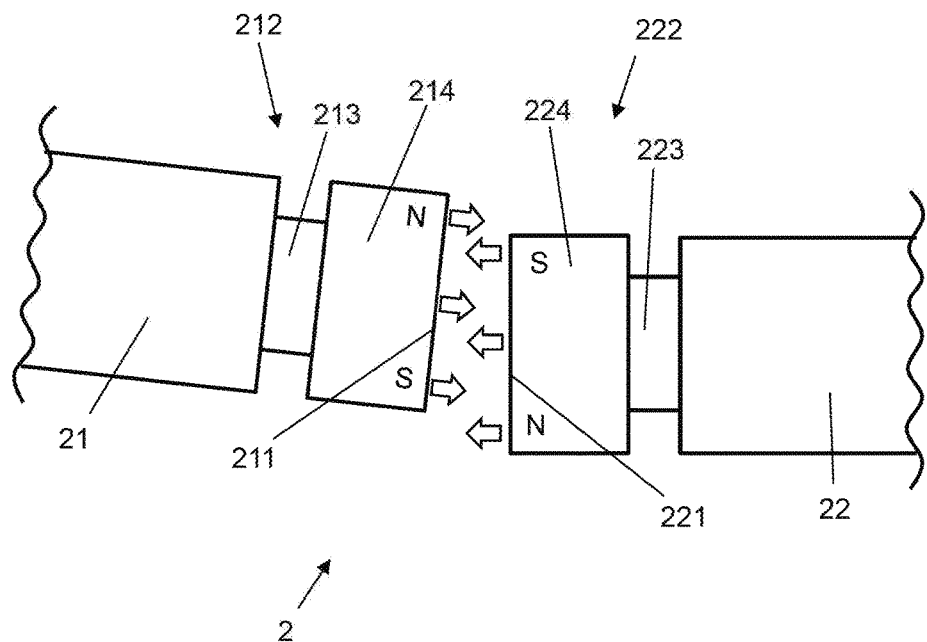
FIG. 2 is a schematic view of a further example aerodynamic structure according to the invention.

FIG. 2 shows an example aerodynamic structure 2 comprising a pair of magnetic seal elements 212, 222 configured to create an attractive magnetic force therebetween. The aerodynamic structure 2 comprises a first region 21, a second region 22, a first magnetic sealing surface 211, and a second magnetic sealing surface 221, which may have the same features as the corresponding components of the aerodynamic structure 1 described above.

The first magnetic sealing surface 211 is formed by a first magnetic seal element 212. The first magnetic seal element 212 comprises a first magnet 214 and a first flexible mounting 213 which connects the first magnet 214 to the first region 21. In the example of FIG. 2, the second magnetic sealing surface 221 is similarly formed by a second magnetic seal element 222 comprising a second magnet 224 and a second flexible mounting 223 which connects the second magnet 224 to the second region 22. Other examples are possible in which one of the first and second magnetic seal elements 212 does not comprise a magnet, but instead comprises a ferromagnetic component.

The first magnet 214 comprises a bar magnet. In the particular example, the first magnet 214 comprises a flexible strip magnet having a north pole at one long edge of the strip and a south pole at an opposing long edge of the strip (as illustrated in FIG. 2, the long edges of the magnet are perpendicular to the plane of the page). The second magnet 224 has the same features as the first magnet 214, but is oppositely oriented with respect to its magnetic poles. In particular, when the magnetic sealing surfaces 211, 221 are in contact, the north pole edge of the first magnet 214 is adjacent the south pole edge of the second magnet 224, and vice versa. This opposite arrangement is necessary in order to ensure that the magnetic force between the magnetic sealing surfaces 211, 221 is attractive rather than repulsive.

The magnetic properties (e.g. material, residual induction, maximum operating temperature, and the like) of the first and second magnets 214, 224 are selected such that contact between the first and second magnetic sealing surfaces 211, 221 is able to be maintained when the aerodynamic structure 2 is in the first configuration, under the conditions which may typically be expected during operation of the aerodynamic structure (e.g. during flight of an aircraft in which the aerodynamic structure is comprised). Such conditions may include relative movement of the first and second regions 21, 22 along any direction, and/or a pressure differential across the gap that is being sealed by the first and second sealing surfaces 211, 221. The magnetic properties of the first and second magnets 214, 224 may be selected such that the attractive magnetic force between the first and second sealing surfaces 211, 221 is sufficiently low to permit relative sliding movement of the first and second sealing surfaces 211, 221 when the aerodynamic structure is in the first configuration.

The first flexible mounting 213 is configured such that the first magnet 214 is movable relative to the first region 21 in at least a direction normal to the first magnetic sealing surface 211. This may be achieved, for example, by forming the first flexible mounting 213 from a material which is compressible and extensible in a direction normal to the first magnetic sealing surface 211. Alternatively or additionally, the first flexible mounting 213 can be attached to the first region 21 in a manner which permits relative movement between the first flexible mounting 213 and the first region 21, at least in a direction normal to the first magnetic sealing surface 211. The first flexible mounting 213 may be configured to permit a selected amount of relative movement between the first flexible mounting 213 and the first region 21. A particular example of an attachment which permits relative movement between the first flexible mounting and the first region is described below with reference to FIGS. 3*a* and 3*b*.

The first flexible mounting 213 may be fixed to the first magnet 214 in any suitable manner. For example, the first flexible mounting 213 may comprise a cavity or other retaining formation in which the first magnet 214 is contained/retained. The first flexible mounting 213 may partially or fully encase/enclose the first magnet 214. The first flexible mounting 213 may be formed from any suitable material, such as a plastics material. The second flexible mounting 223 has the same features as the first flexible mounting 213. The first flexible mounting 213 may be fixed to the first region 21 in any suitable manner. For example, the first flexible mounting 213 may comprise a formation configured to engage with a corresponding formation on the first region 21. Alternatively or additionally, the first flexible mounting 213 may be bonded to the first region 21, and/or may be fixed to the first region 21 using fasteners.

In some examples, the first magnetic seal element 212 is configured such that movement of the first magnet 214 in directions other than the direction normal to the first magnetic sealing surface 211 is constrained, or substantially prevented. This may be achieved, for example, by providing a support formation on the first region 11 which is configured to constrain movement of the first magnet 214 parallel to the first magnetic sealing surface 211. The second magnetic seal element 222 may be similarly configured such that movement of the second magnet 224 in directions other than the direction normal to the second magnetic sealing surface 221 is constrained, or substantially prevented. A particular example of a magnetic seal element which is configured to constrain movement of a magnet in directions other than the direction normal to the magnetic sealing surface is described below with reference to FIGS. 3*a* and 3*b*.

Figure 3A:
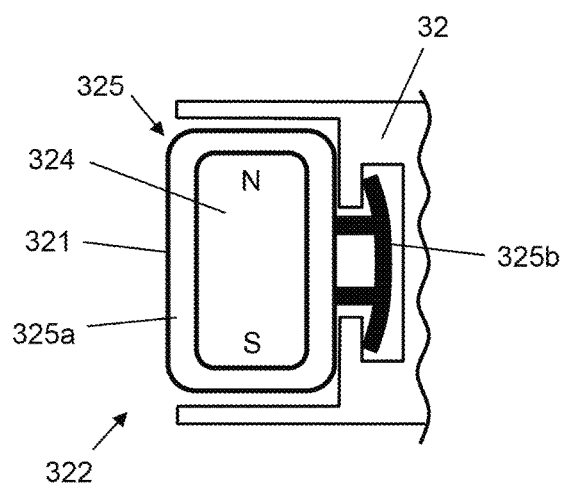
FIGS. 3a and 3b are a cross-sections through part of an example magnetic seal element of an example aerodynamic structure according to the invention, in two different configurations of the seal element.
Figure 3B:
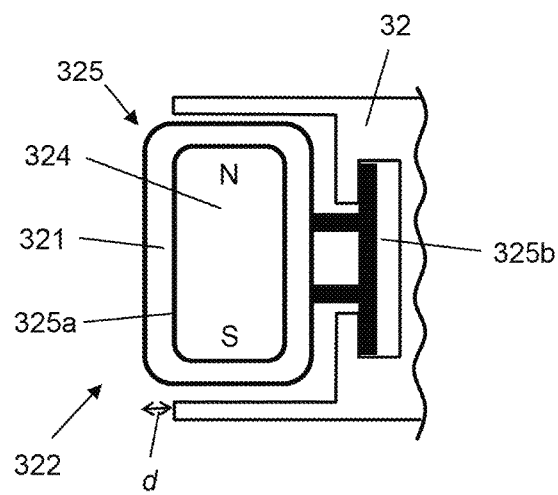

FIGS. 3*a* and 3*b* show an example magnetic sealing element 322, which may be either of the first or second magnetic sealing elements 212, 222 of the aerodynamic structure 2. FIG. 3*a* shows the magnetic sealing element 322 in a retracted configuration and FIG. 3*b* shows the magnetic sealing element 322 in an extended configuration. The magnetic sealing element 322 comprises a magnet 324, and a flexible mounting 325 which connects the magnet 324 to a region 32 of an aerodynamic structure (e.g. the example aerodynamic structure 1 or the example aerodynamic structure 2). The magnet 324 may have any of the features of the example magnets 214, 224 of FIG. 2. The flexible mounting 325 comprises a first part 325*a* which engages with the magnet 324, and a second part 325*b* which engages with the region 32. The first part 325*a* of the flexible mounting fully encases the magnet 324. Consequently, an outer surface of the flexible mounting 325 forms a magnetic sealing surface 321 configured to contact a corresponding magnetic sealing surface of an opposing magnetic sealing element (not shown). The second part 325*b* of the flexible mounting comprises a protrusion configured to be received within a corresponding recess formed in the region 32. The first and second parts 325*a*, 325*b* of the flexible mounting are integrally formed from any suitable flexible material, such as a plastics material.

The protrusion and the recess are configured such that the protrusion is securely retained within the recess, whilst permitting some relative movement between the first part 325*a* and the region 32 in a direction normal to the magnetic sealing surface 321. In particular, the first part 325*a* (and therefore the magnet 324) and the region 32 are permitted to move between the retracted configuration shown in FIG. 3*a* and the extended configuration shown in FIG. 3*b*. This is achieved by the protrusion comprising a flexible retaining formation which is biased into a curved configuration, but may be forced into a straight configuration in response to a force pulling the first part 325*a* away from the region 32. Thus, in the absence of such a force the first part 325*a* is retained abutting the region 32, but may move outwardly away from the region 32 by a small distance d. The magnitude of this distance is determined by the configuration of the flexible retaining formation, and may be in the range 1-5 mm. Permitting a small degree of movement normal to the magnetic sealing surface advantageously facilitates maintaining a seal in the face of relative separation movement between the region 32 and a corresponding region of an aerodynamic structure, e.g. separation movement which could be caused by wing bending during flight. Biasing the magnetic seal element 322 into the retracted configuration advantageously reduces or avoids the risk of the magnetic seal element 322 clashing with an opposing magnetic seal element during movement of an aerodynamic structure in which the magnetic seal element 322 is comprised from a second (unsealed) configuration to a first (sealed) configuration.

The magnetic seal element 322 is configured such that movement of the magnet 324 in directions other than the direction normal to the magnetic sealing surface 311 is constrained. In particular, the region 32 comprises a support formation in the form of a channel, and the magnetic seal element 322 is received within the channel. In the retracted configuration the magnetic seal element 322 is almost fully received within the channel, whereas in the extended configuration the magnetic seal element 322 protrudes from the channel. The side walls of the channel limit movement of the magnetic seal element 322, and in particular limit movement of the first part 325a (and therefore the magnetic sealing surface 321), in all directions other than the direction normal to the magnetic sealing surface 321. The degree to which movement in directions other than the magnetic sealing surface normal direction is constrained is determined by the difference between the width of the channel and the height (relative to the orientation shown on FIGS. 3a and 3b) of the magnetic seal element 322. Advantageously, providing a support formation which constrains movement of a magnetic seal element can enable a flexible mounting comprised in that seal element to be more flexible than if no support formation was present. A more flexible mounting can reduce the weight of the seal element, and can also reduce the loads applied to the aerodynamic structure by the seal element.

Figure 4A:
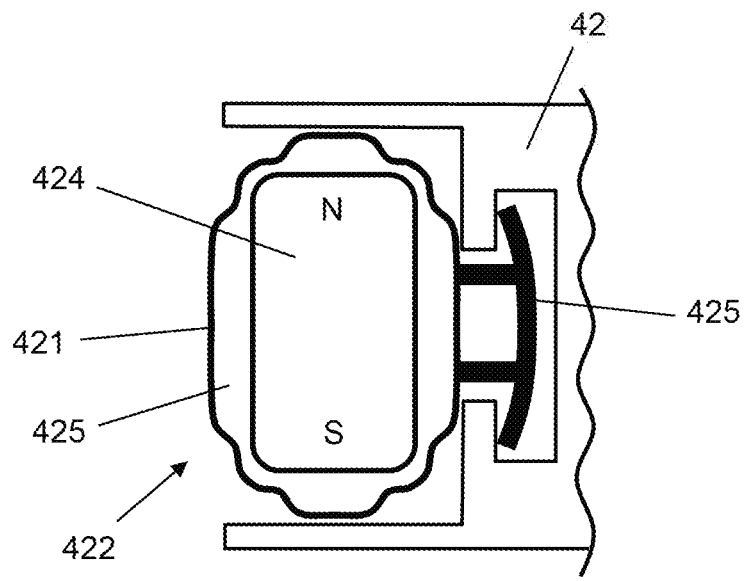
FIG. 4a is a cross-section through part of a further example region of an example aerodynamic structure according to the invention.
Figure 4B:
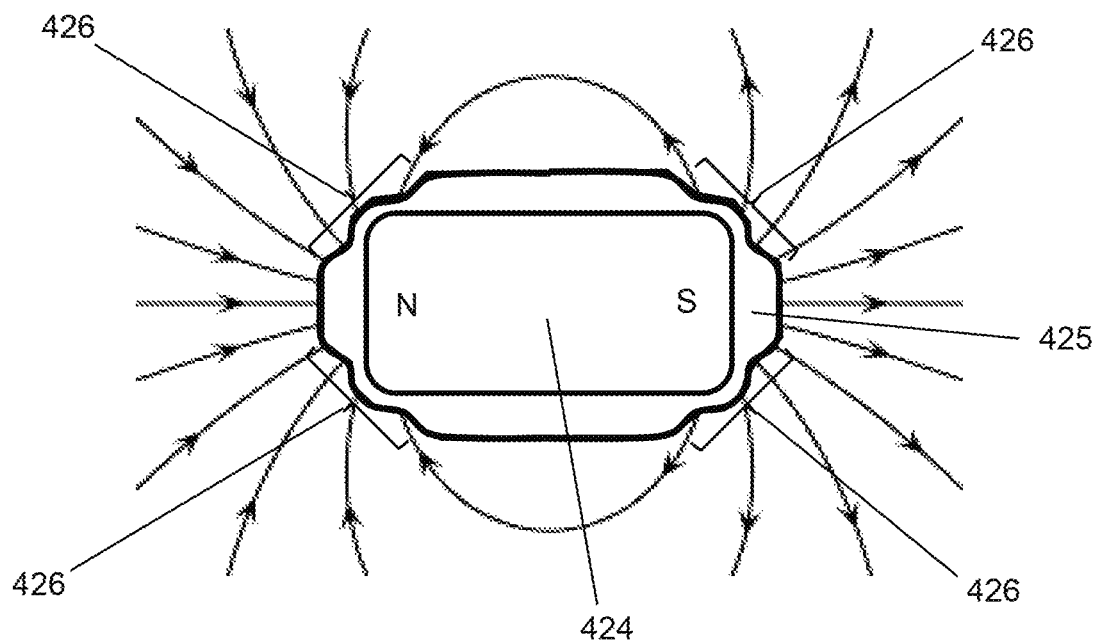

In an aircraft environment a significant number of ferromagnetic particles, for example generated by wear of surrounding components, are typically present. It may be expected that such ferromagnetic particles will be attracted to the first and second magnetic sealing surfaces of aerodynamic structures according to the invention, and will build up on these surfaces. Such a build-up of particles could cause damage to the magnetic sealing surfaces and/or reduce the sealing efficacy. FIGS. 4a and 4b show an example magnetic seal element 422 which is configured to reduce or prevent the build-up of ferromagnetic particles on a magnetic sealing surface 421 of the magnetic seal element.

The example magnetic seal element 422 comprises a magnet 424, a flexible mounting 425 which connects the magnet 424 to a region 42 of an aerodynamic structure (e.g. the example aerodynamic structure 1 or the example aerodynamic structure 2), and a magnetic sealing surface 421. The features of the magnetic seal element 422 may be the same as the features of the example magnetic seal element 322 of FIGS. 3a and 3b, except where explicitly stated otherwise in the following description.

The magnetic seal element 422 comprises at least one trap feature 426 adjacent to the magnetic sealing surface 421. FIG. 4b shows the magnetic field generated by the magnet 424. The trap feature 426 is configured such that a surface of the magnetic seal element 422 comprised in the trap feature 426 is closer to a magnetic pole of the magnet 424 than any location on the magnetic sealing surface 421. As such, the magnetic field strength at the surface of the trap feature is stronger (that is, the magnetic flux is more dense) than the magnetic field strength at any location on the magnetic sealing surface 421. Ferromagnetic particles attracted to the magnetic seal element 422 will tend to migrate toward the locations where the magnetic flux is most dense (that is, the magnetic field is strongest) and will therefore end up in the trap feature 426. The shape of the trap feature 426 is such that the ferromagnetic particles, once in the trap feature 426, are unlikely or unable to migrate further. Once caught in the trap feature 426, over time it is expected that the ferromagnetic particles will corrode, demagnetise, and wash away without any particular maintenance or cleaning intervention being performed.

Preferably, a trap feature 426 is provided in respect of each magnetic pole of the magnet 424. In the particular illustrated example, the magnetic seal element 422 comprises two trap features 426 for each magnetic pole. In particular, the magnetic sealing surface 421 formed by the magnetic seal element 422 comprises opposing long sides, and the magnetic sealing element 422 comprises a trap feature 426 adjacent each long side. The magnetic seal element also comprises a pair of opposing long sides opposite (with respect to the magnetic sealing surface normal direction) to the long sides of the magnetic sealing surface 421. Each of these long sides also comprises a trap feature 426.

Figure 5A:
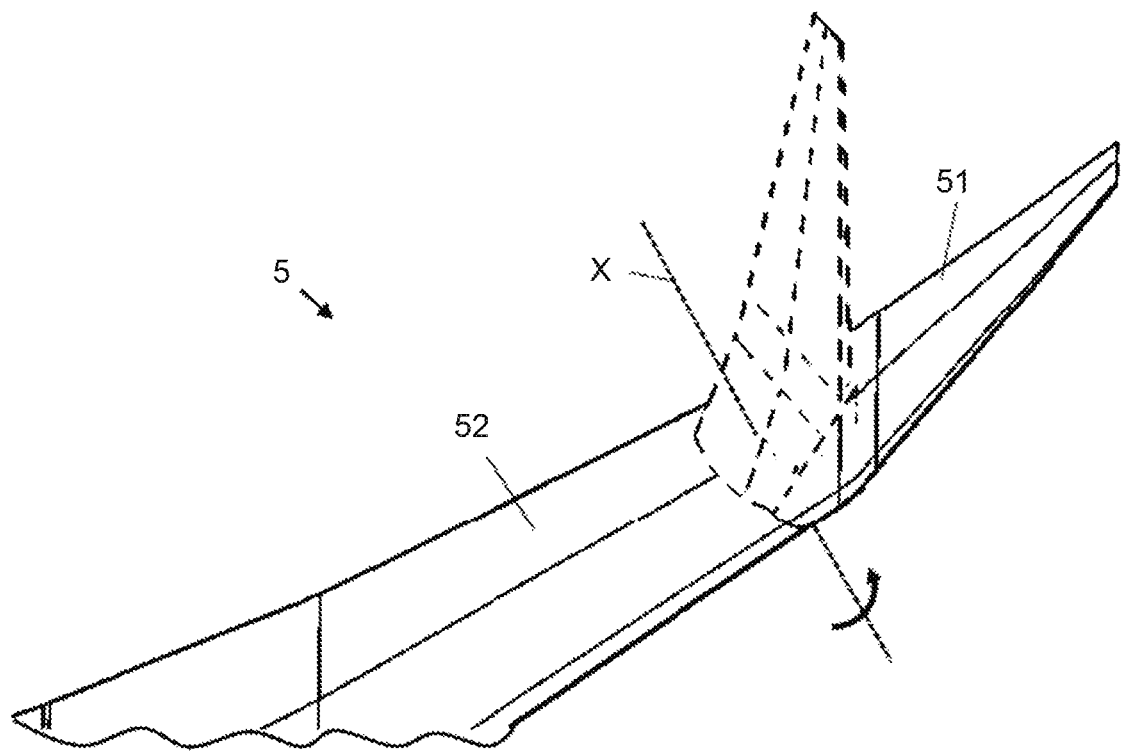
FIGS. 5a and 5b are schematic views of an example aircraft folding wing-tip.

FIG. 5a is a perspective top view (relative to an operational orientation of the aircraft) of an example aerodynamic structure for an aircraft. The aerodynamic structure comprises a first region, and a second region which is rotatable relative to the first region. In the illustrated example the aerodynamic structure is a foldable aircraft wing 5, the first region comprises a root section 52 of the wing, and the second region comprises a tip section 51 of the wing. The tip section 51 is rotatable relative to the root section 52 about an axis X. The foldable aircraft wing 5 may comprise an aerodynamic structure according to any of the examples described above in relation to FIGS. 1 to 4b.

The tip section 51 is moveable between a fully extended position (shown in solid lines on FIG. 8) and at least one folded position (shown in dashed lines on FIG. 5). The axis X is angled relative to "wing" vertical by 12-15°. "Wing" vertical is an axis perpendicular to the local centroidal axis of the wing box. The wing vertical axis deviates from the global aircraft vertical axis by the local dihedral angle, which is determined by the as-designed wing shape (i.e. jig shape) and the wing flexural curvature under a given set of load conditions (e.g. 1g cruise shape, ground shape, etc.). Configuring the foldable aircraft wing 5 such that the tip and root sections 51, 52, are relatively rotatable about an axis which is at an angle to the wing vertical axis enables the tip and root sections 51, 52, to move over each other without clashing when moving between folded and unfolded configurations of the foldable aircraft wing 5.

Figure 5B:
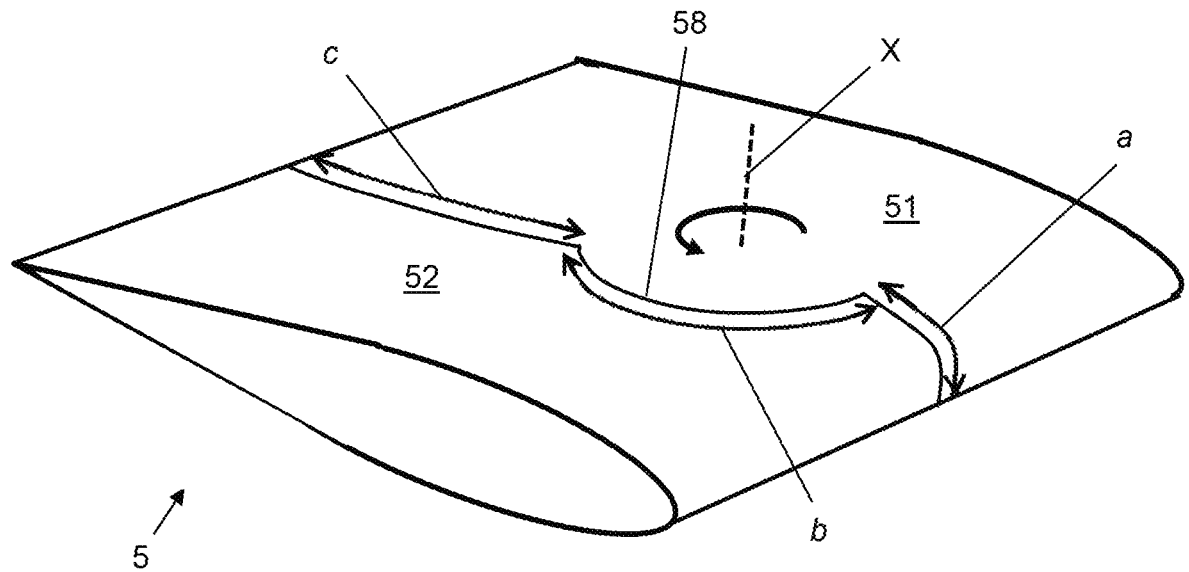

FIG. 5b shows a joint part of the example foldable aircraft wing 5 in more detail. Only an upper part of the joint 58 is visible in FIG. 5b. The upper part of the joint 58 has three distinct sections a, b and c, which experience different types of relative movement during a folding/unfolding movement of the aircraft foldable wing 5. A leading edge joint section a of the joint 58 comprises two opposing sealing surfaces (one on the tip section 51 and one on the root section 52), which are cross-sectional planes through the aerodynamic profile of the foldable wing 5. During a folding/unfolding movement, the sealing surfaces of the leading edge joint section a experience relative movement along a direction which is substantially parallel with a surface normal of one of the sealing surfaces. Clashing of seal elements is not a significant issue for this joint section, and so a conventional compression seal arrangement may be used to seal the leading edge joint section a. A lower part of the joint 58, which is not visible in FIG. 5b, has the same general configuration as the upper part. That is, the lower part of the joint 58 also comprises three distinct sections a, b and c which have equivalent features to the sections a, b and c of the upper part of the joint 58.

A central joint section b of the joint 58 is spiral-shaped and comprises a concave sealing surface on the root section 52 and an opposing convex sealing surface on the tip section 51. Each of the central joint section sealing surfaces is substantially perpendicular to the aerodynamic surface of the foldable wing 5 in the areas immediately adjacent the central joint section b. During a folding/unfolding movement of the foldable wing 5, the central sealing surfaces will simultaneously experience relative rotational movement, relative spanwise separation movement (due to the spiral shape of the central joint section b), and relative vertical separation movement (due to the rotation axis X being angled to the wing vertical axis). The overall relative movement of any given location pair on the central sealing surfaces during movement of the foldable wing 5 between a folded configuration and an unfolded configuration (which is a sum of the components listed above) occurs along a direction which is at an angle in the range 1-60° to a plane of the aerodynamic surface. The central sealing surfaces may comprise first and second magnetic sealing surfaces having the features of any of the example magnetic sealing surfaces described above. A part of the foldable wing 5 which includes the central joint section b may therefore be considered to be an aerodynamic structure according to the invention.

Figure 5C:
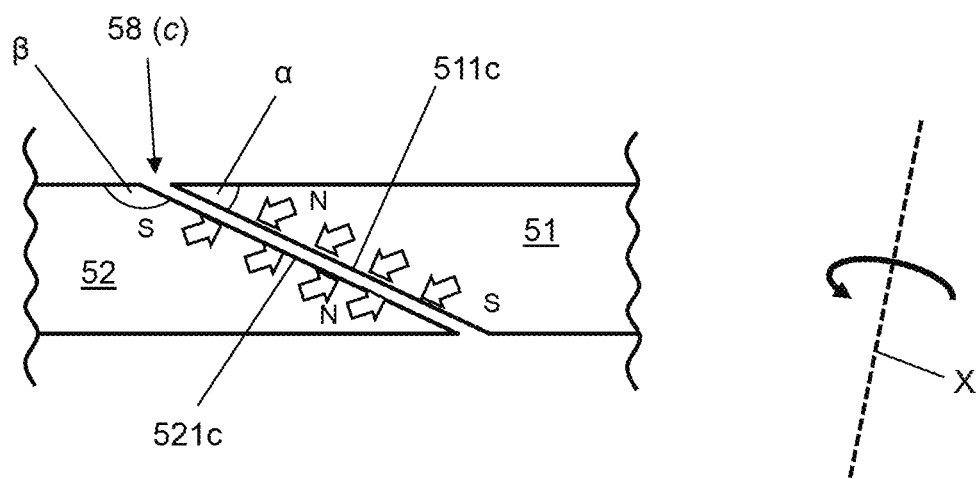
FIG. 5c is a cross-section through part of an example joint for the example folding wing-tip of FIG. 5b.
Figure 5D:
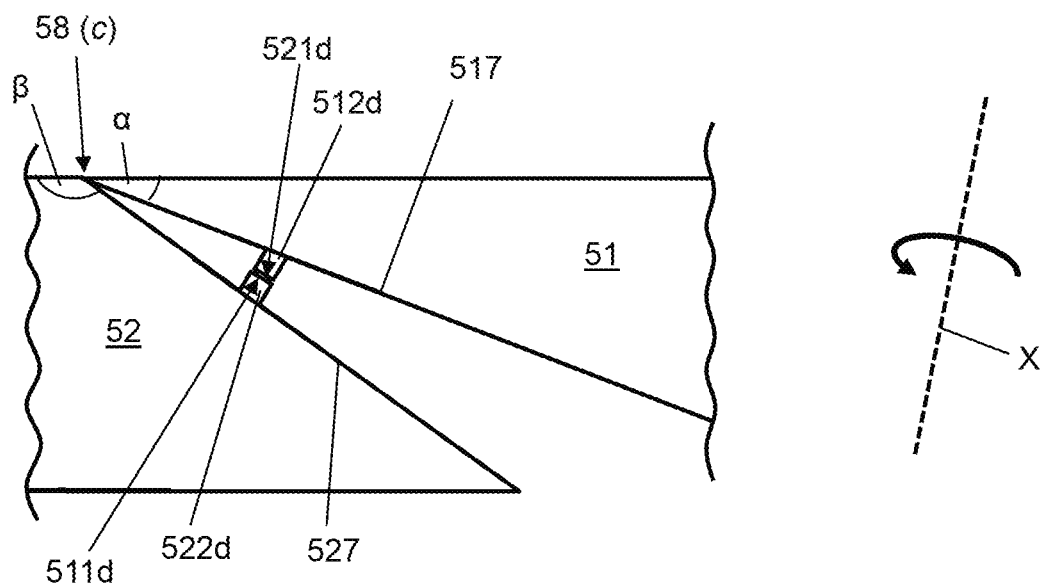
FIG. 5d is a cross-section through part of a further example joint for the example folding wing-tip of FIG. 5b.

A trailing edge joint section c of the joint 58 comprises two opposing sealing surfaces (one on the tip section 51 and one on the root section 52). During a folding/unfolding movement of the foldable wing 5 the trailing edge region of the tip section 51 passes over the trailing edge region of the root section 52, and a corresponding pair of locations on the trailing edge sealing surfaces will experience relative movement similar to the relative movement experienced by a location pair located towards the trailing edge end of the central joint section b. The overall relative movement of any given location pair on the trailing edge sealing surfaces during movement of the foldable wing 5 between a folded configuration and an unfolded configuration occurs along a direction which is at an angle in the range 1-60° to a plane of the aerodynamic surface. The trailing edge sealing surfaces may comprise first and second magnetic sealing surfaces having the features of any of the example magnetic sealing surfaces described above. A part of the foldable wing 5 which includes the trailing edge joint section c may therefore be considered to be an aerodynamic structure according to the invention. Other examples are envisaged in which the trailing edge joint section c is sealed by a different (e.g. non-magnetic) type of seal, or is not sealed. Various arrangements of the trailing edge sealing surfaces are possible. FIGS. 5c and 5d show two alternative sealing surface arrangements for sealing the trailing edge joint section c.

FIG. 5c is a section through a part of the upper skin of the foldable wing 5, which includes the trailing edge section c of the upper part of the joint 58. The foldable wing 5 also comprises a lower skin which has a corresponding trailing edge joint section of the same type as the trailing edge joint section c. The features of the upper trailing edge joint section c described below apply equivalently to the lower trailing edge joint section.

In FIG. 5c, the upper skin of the tip section 51 of the foldable wing 5 comprises a first sealing surface 511c which is at an acute angle α to the aerodynamic surface formed by the upper skin of the tip section 51 and the upper skin of the root section 52. The acute angle α between the first sealing surface 511c and the aerodynamic surface is in the range 5-10°. The upper skin of the root section 52 comprises a second sealing surface 521c which is at an obtuse angle β to the aerodynamic surface. The obtuse angle β between the first sealing surface 511c and the aerodynamic surface is in the range 170-175°. The angles α and β are such that α+β=180°. The first and second sealing surfaces 511c, 521c are parallel and in contact with each other when the foldable wing 5 is in the extended position. FIG. 5c shows the foldable wing in an intermediate position very close to the fully extended position, such that a small gap exists between the first and second sealing surfaces 511c, 521c.

Each of the first and second sealing surfaces 511c, 521c is a magnetic sealing surface, and is configured such that an attractive magnetic force exists between the first and second sealing surfaces 511c, 521c when the foldable wing 5 is in the extended configuration. In some examples, the first and second sealing surfaces 511c, 521c are entirely magnetic, such that an attractive magnetic force exists between each part of the first and second sealing surfaces 511c, 521c. In other examples, one or both of the first and second sealing surfaces 511c, 521c is partially magnetic, such that an attractive magnetic force (or a relatively high magnetic force) exists between some locations on the first and second sealing surfaces 511c, 521c but no attractive magnetic force (or a relatively small magnetic force) exists between some other locations on the first and second sealing surfaces 511c, 521c. The magnetic force is substantially perpendicular to the first and second sealing surfaces 511c, 521c (at least when the foldable wing 5 is in the extended configuration). Each of the first and second sealing surfaces 511c, 521c may have any of the features of any of the example magnetic sealing surfaces 111, 121, 211, 221, 311, 321, 421 described above.

In FIG. 5d the tip section 51 of the foldable wing 5 comprises a first mating surface 517 which is at an acute angle α to the aerodynamic surface formed by the tip section 51 and the root section 52. The acute angle α between the first mating surface 517 and the aerodynamic surface is in the range 5-10°. The root section 52 comprises a second mating surface 527 which is at an obtuse angle β to the aerodynamic surface. The obtuse angle β between the first sealing surface 511c and the aerodynamic surface is in the range 165-175°. In the illustrated example, the angles α and β are such that α+β>180°. This means that a space exists between the first and second mating surfaces 517, 527 when the foldable wing 5 is in the extended position. However; other examples are possible in which the angles α and β are such that α+β=180°. In such examples the tip section 51 and the root section 52 are configured such that a space exists between a surface of the tip section 51 and the root section 52, beneath the aerodynamic surface (that is, within the aerodynamic profile of the foldable wing 5) when the foldable wing 5 is in the extended position. FIG. 5d shows the foldable wing 5 in the extended position. The first and second mating surfaces 517, 527 contact each other when the foldable wing 5 is in the extended position, at least at the edges of these surfaces immediately adjacent the aerodynamic surface. This contact substantially impedes airflow between the interior of the foldable wing 5 and the external environment, but typically cannot entirely prevent such airflow. As such, the example arrangement of FIG. 5d comprises a further magnetic seal arrangement, in the space beneath the aerodynamic surface.

A first magnetic seal element 512d is provided on the first mating surface 517 and a second magnetic seal element 522d is provided on the second mating surface 527. Each of the first and second magnetic seal elements 512d, 522d extends substantially perpendicularly to its associated mating surface, at least in a sealed configuration of the foldable wing 5. In some examples, one or both of the first and second magnetic seal elements 512d, 522d is retractable (e.g. in a similar manner to the magnetic seal element 322 of FIGS. 3a and 3b). In some examples, one or both of the first and second magnetic seal elements 512d, 522d is configured such that a magnetic sealing surface 511d, 521d of the magnetic seal element is substantially flush with the corresponding mating surface when the folding wing is in a folded configuration, and protrudes outwardly (as shown in FIG. 5d) when the foldable wing 5 is in the unfolded configuration. Each of the first and second magnetic seal elements 512d, 522d may have any or all of the features of the example magnetic seal elements 212, 222, 322, 422 described above. The first and second magnetic sealing surfaces 511d, 521d are configured such that an attractive magnetic force exists between the first and second sealing surfaces 511d, 521d when the foldable wing 5 is in the extended configuration. Each of the first and second sealing surfaces 511d, 521d may have any of the features of any of the example magnetic sealing surfaces 111, 121, 211, 221, 311, 321, 421 described above. Each of the first and second magnetic seal elements 512d, 522d is attached to its respective mating surface such that airflow cannot pass between that seal element and the mating surface. Any suitable attachment means known in the art may be used. Airflow between the inside of the foldable wing 5 and the external environment, when the foldable wing 5 is in the extended position, is therefore reduced or prevented.

It should be appreciated that FIG. 5b illustrates a particular example joint arrangement for a foldable wing. The illustrated three-section joint has advantages for achieving and maintaining a good aerodynamic seal in the face of wing bending loads experienced by the foldable wing during flight, but other (simpler or more complex) joint arrangements may alternatively be used. Provided that a joint is between two foldable wing regions which are configured to move relative to each other along a direction at an angle in the range 1-90° to the normal of a sealing surface of the joint, during a folding/unfolding movement, then the joint may advantageously be sealed using magnetic sealing surfaces, as described above.

Figure 6:
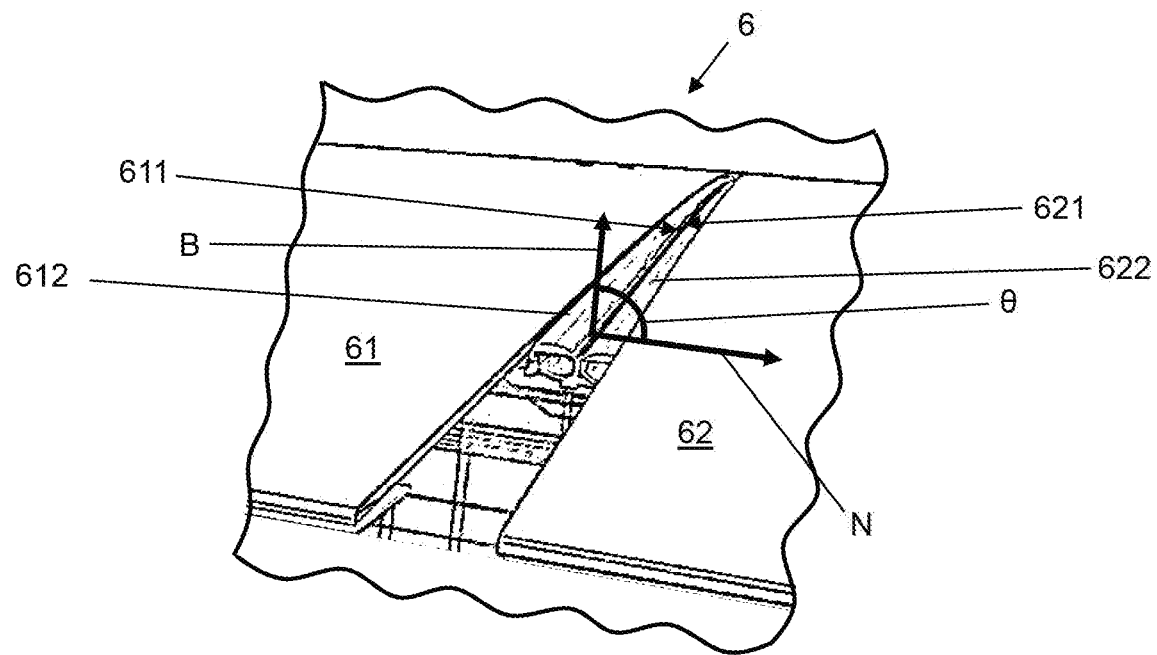
FIG. 6 is a schematic view of part of an example aircraft spoiler arrangement.

FIG. 6 is a perspective top view (relative to an operational orientation of the aircraft) of an example aerodynamic structure 6 for an aircraft. The aerodynamic structure comprises a first region, and a second region which is movable relative to the first region. In the illustrated example the aerodynamic structure 6 is a pair of adjacent spoilers for an aircraft wing. The first region comprises a first spoiler 61 of the pair, and the second region comprises a second spoiler 62 of the pair. The aerodynamic structure 6 may have any of the features of the example aerodynamic structures 1 and 2 described above.

Each of the first and second spoilers 61, 62 is configured to pivot about a spanwise axis at the leading edge of the spoiler, between a retracted position in which the trailing edge of the spoiler meets the outer skin of a wing on which the spoiler pair is installed, and at least one deployed position in which a vertical gap exists between the trailing edge of the spoiler and the wing skin or the leading edge of a flap. In FIG. 6, both of the first and second spoilers 61, 62 are in the retracted position. Each of the first and second spoilers 61, 62 is independently operable, such that the first spoiler 61 can be in the retracted position whilst the second spoiler 62 is in a deployed position, and vice versa.

The adjacent chordwise edges of the first and second spoilers 61, 62 respectively comprise first and second magnetic sealing surfaces 611, 622. The first and second magnetic sealing surfaces are formed by first and second magnetic seal elements 612, 622, which may have any of the features of any of the example magnetic seal elements described above. Each of the first and second spoilers 61, 62, also has an opposite chordwise edge (not shown), which may also comprise a magnetic sealing surface, to seal a gap between the spoiler and a further adjacent spoiler, or a gap between the spoiler and the wing skin. During movement of one or both of the first and second spoilers 61, 62 between the retracted position and a deployed position (assuming the first and second spoilers are not simultaneously moving in the same manner), relative movement of the first and second spoilers 61, 62 occurs along a direction B which is at an angle θ to the normal N of the first sealing surface 111. In the case of pivoting spoilers, θ is 90°.

Known spoiler chordwise seal elements are arranged to lightly contact each other when the adjacent spoilers are both retracted, but have no compression or geometric interference (because this would cause clashing when the spoilers are differentially operated). This means that the sealing is relatively ineffective, and cannot be maintained in the face of relative spoiler movement caused by normal loads experienced during flight. The example aerodynamic structure 6 can therefore advantageously provide significantly improved sealing between adjacent spoilers during cruising, and therefore improved aerodynamic performance of the aircraft on which those spoilers are installed.

Figure 7:
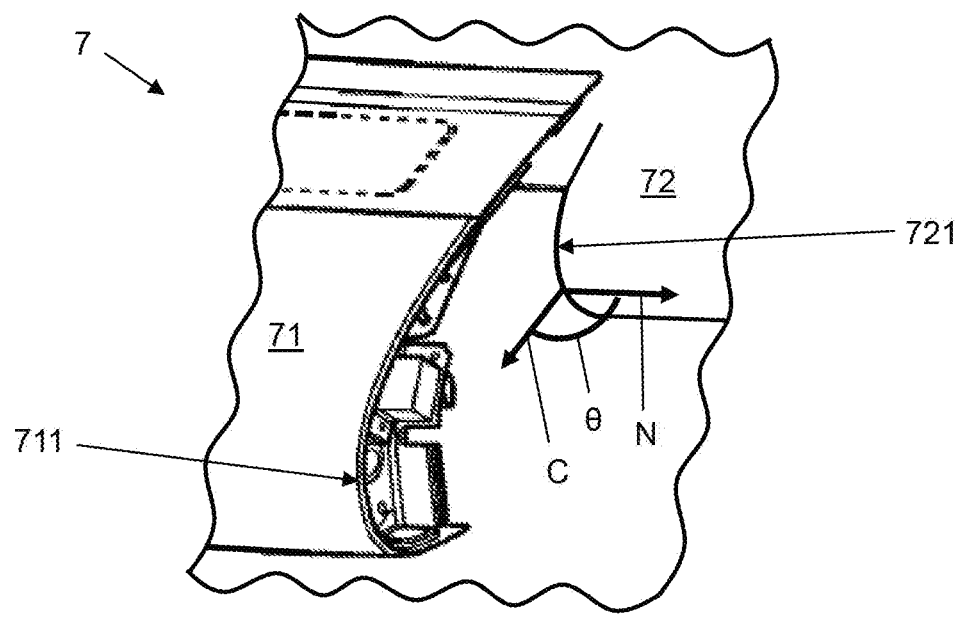
FIG. 7 is a schematic view of part of an example aircraft slat arrangement.

FIG. 7 is a perspective top view (relative to an operational orientation of the aircraft) of a further example aerodynamic structure 7 for an aircraft. The aerodynamic structure comprises a first region, and a second region which is movable relative to the first region. In the illustrated example the aerodynamic structure 7 is a leading edge part of an aircraft wing including an extendible slat. The first region comprises the slat 71 and the second region comprises a fixed leading edge structure 72. The aerodynamic structure 7 may have any of the features of the example aerodynamic structures 1 and 2 described above.

The slat 71 is configured to extend forwardly and downwardly (relative to an operational orientation of the aircraft) relative to the fixed leading edge structure 72, between a retracted position in which the trailing edge of the slat 71 is in contact with an upper surface of the fixed leading edge structure 72, and at least one deployed position in which a gap exists between the trailing edge of the slat 71 and the surface of the fixed leading edge structure 72. In FIG. 7, the slat 71 is in a deployed position. It can be seen from FIG. 7 that the fixed leading edge structure 72 comprises a recess, which has a spanwise length substantially equal to the spanwise length of the slat 71, and a chordwise depth substantially equal to the chordwise depth of the slat 71. The slat 71 is received into this recess when it is in the retracted position, such that a continuous aerodynamic surface is formed by the leading edge part of the slat 71 and the leading edge part (that is, the non-recessed part) of the fixed leading edge structure 72. To improve the aerodynamic performance of this aerodynamic surface, it is desirable to seal the chordwise gaps between each chordwise edge of the slat (only one such edge is visible in FIG. 7) and the adjacent edge of the fixed leading edge structure 72. This may be achieved, according to the invention, as follows.

Each chordwise edge of the slat 71 comprises a first magnetic sealing surface 711. A corresponding second magnetic sealing surface 721 is comprised in an opposing edge of the fixed leading edge structure 72. The first and second magnetic sealing surfaces 711, 72 may have any of the features of any of the example magnetic sealing surfaces described above. During movement of the slat 71 between the retracted position and a deployed position, relative movement of the slat 71 and the fixed leading edge structure 72 occurs along a direction C which is at an angle θ to the normal N of the first sealing surface 111. In the case of an extendible slat, θ is 90°.

Known slat end seal elements are arranged to lightly contact each other when the adjacent spoilers are both retracted, but have no compression or geometric interference (because this would cause clashing when the slat is retracted). This means that the sealing is relatively ineffective, and cannot be maintained in the face of slat movement caused by normal loads experienced during flight. The example aerodynamic structure 7 can therefore advantageously provide significantly improved sealing between the ends of a slat and an adjacent fixed leading edge structure during cruising, and therefore improved aerodynamic performance of the aircraft on which the slat is installed. Moreover, because it is difficult or impossible to achieve good aerodynamic sealing of gaps at the chordwise edges of slats with known seal arrangements, currently where a wing has multiple adjacent slats along its span, these slats are connected together and cannot be independently operated. The ability to effectively seal chordwise gaps between adjacent slats, as provided by examples of the invention, enables the possibility of independently operable adjacent slats, which could further improve aircraft performance.

Figure 8:
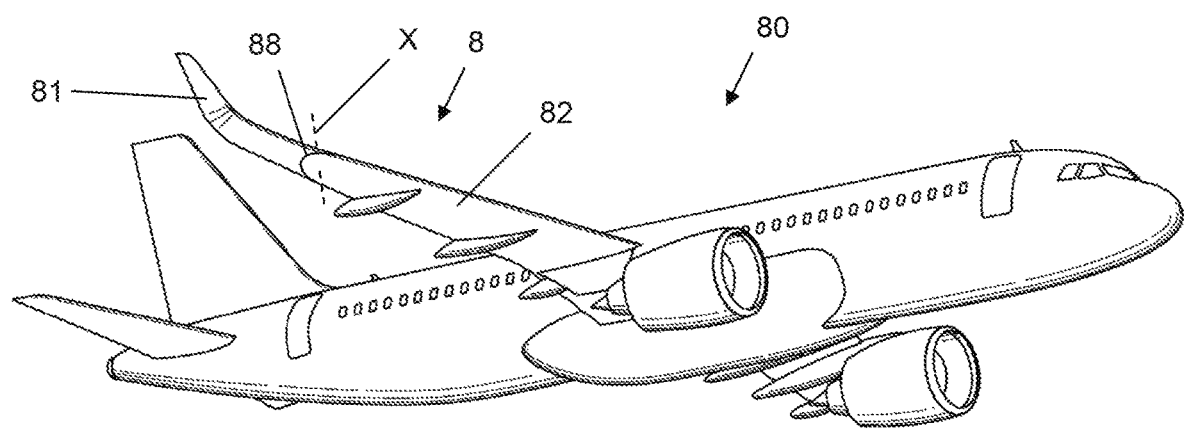
FIG. 8 is a schematic view of an example aircraft comprising an aerodynamic structure according to the invention.

FIG. 8 is a perspective view of an aircraft 80 comprising an aerodynamic structure according to the invention. In particular the aircraft 80 comprises an aerodynamic structure in the form of a foldable aircraft wing 8 having a root section 82 and a tip section 81, which are relatively rotatable about an axis X. The foldable wing 8 may have any or all of the features of the example foldable wing 5 of FIGS. 5a and 5b. The foldable wing 8 may be an aerodynamic structure according to any of the example aerodynamic structures 1, 2 described above. A lower part of the joint 88 between the root section 82 and the tip section 81 is visible in FIG. 8. The example foldable wing 8 comprises a winglet. In other examples, an aerodynamic structure in the form of an aircraft wing may comprise any other type of wingtip device, or may not comprise a wingtip device. The aircraft 80 may comprise one or more further aerodynamic structures according to the invention. For example, the aircraft 80 may comprise a pair of spoilers having the features of the example spoilers 61, 62 of FIG. 6. Alternatively or additionally, the aircraft 80 may comprise a slat and a fixed leading edge structure having the features of the example slat 71 and fixed leading edge structure 72 of FIG. 7. The aircraft 80 may alternatively or additionally comprise any other type of aerodynamic structure according to the invention.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. An aerodynamic wing structure comprising:
a first wing segment having a first side and a first slot in the first side;
a second wing segment having a second side and a second slot in the second side;
a first magnet slidably mounted in the first slot, wherein the first magnet is configured to slide in the first slot between an extended position in which a portion of the first magnet extends beyond the first side and a retracted position in which the first magnet is retracted within the first slot;
a second magnet slidably mounted in the second slot, wherein the second magnet is configured to slide in the second slot between an extended position in which a portion of the second magnet extends beyond the second side and a retracted position in which the first magnet is retracted within the second slot;
wherein the first and second magnets are aligned to magnetically attract and attach to each other to close a gap between the first side and the second side while at least one of the first wing segment and the second wing segment is in a first position, and
wherein the first magnet is retracted in the first slot and the second magnet is retracted in the second slot while at least one of the first and second wing segments is in a second position.

2. The aerodynamic wing structure according to claim 1, further comprising a first flexible mount connected to the first slot and to the first magnet.

3. The aerodynamic wing structure according to claim 1, further comprising at least one trap feature adjacent to a magnetic pole of the first magnet.

4. The aerodynamic wing structure according to claim 3, wherein the first magnet includes opposing long sides, and wherein the at least one trap feature includes a trap adjacent each of the long sides.

5. The aerodynamic wing structure according to claim 1, wherein the first slot includes a support formation configured to constrain the first magnet to movement along the first slot.

6. The aerodynamic wing structure according to claim 5, wherein the support formation comprises a channel, and wherein the first magnetic is at least partially received within the channel.

7. The aerodynamic wing structure according to claim 1, wherein the first magnet comprises a flexible strip magnet having a north pole at one long edge of the flexible strip magnet and a south pole at an opposing long edge of the flexible strip magnet.

8. The aerodynamic wing structure according to claim 1, further comprising a first sealing surface connected to the first magnet and a second sealing surface connected to the second magnet.

9. The aerodynamic wing structure according to claim 8, wherein at least one of the first and second magnetic sealing surfaces comprises an anti-friction material.

10. The aerodynamic wing structure according to claim 8, wherein the first and second magnetic sealing surfaces are configured such that a negligible magnetic force exists between the first and second magnetic sealing surfaces when a distance between the first and second magnetic sealing surfaces is greater than a preselected value.

11. The aerodynamic wing structure according to claim 8, wherein during movement between the first position and the second position, relative movement of the first and second magnets occurs along a direction which is at an angle in the range 1-60° to a normal of the first sealing surface and/or the normal of the second sealing surface.

12. The aerodynamic wing structure according to claim 1, wherein the first wing segment comprises an aircraft wing and the second wing segment comprises one of: a slat; an aileron; a spoiler; and a flap.

13. The aerodynamic wing structure according to claim 12, wherein during movement between the first position and the second position, relative movement of the first and second magnets occurs along a direction perpendicular to a normal of the first side and/or the normal of the second side.

14. The aerodynamic wing structure of claim 1 including:
a first strip including the first magnet and slidably mounted in the first slot, and
a second strip including the second magnet and slidably mounted in the second slot, wherein the first and second strips abut to close the gap while the at least one of the first and second wing segments are in the first position.

15. The aerodynamic wing structure of claim 1, wherein the first wing segment is a root section of a wing and the second wing segment is a wing tip section, wherein the first position is a deployed position and the second position is a folded position.

16. The aerodynamic wing structure of claim 1, wherein the first wing segment is a first spoiler and the second wing segment is a second spoiler adjacent the first spoiler while mounted on a wing, wherein the first position is a retracted position and the second position is a deployed position.

17. The aerodynamic wing structure of claim 1, wherein the first wing segment includes a first aerodynamic surface which is parallel to the first slot and the second wing segment includes a second aerodynamic surface which is parallel to the second slot, wherein the first and second aerodynamic surfaces are configured to be exposed to an airflow moving over the aerodynamic wing structure during flight of the aerodynamic surface.

18. The aerodynamic wing structure of claim 1 including:
a first flexible mount attaching the first magnet to the first side, wherein the first flexible mount biases the first magnet towards the second position, and
a second flexible mount attaching the second magnet to the second side, wherein the second flexible mount biases the second magnet towards the second position.

\* \* \* \* \*